United States Patent
Yang et al.

(10) Patent No.: US 8,547,985 B2
(45) Date of Patent: Oct. 1, 2013

(54) NETWORK INTERFACE CONTROLLER CAPABLE OF SHARING BUFFERS AND BUFFER SHARING METHOD

(75) Inventors: Kuo-Nan Yang, Hsinchu (TW);
Yen-Hsu Shih, Changhua County (TW);
Chia-Ying Chiu, Taoyuan County (TW);
Kai-Wen Cheng, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 202 days.

(21) Appl. No.: 12/942,677

(22) Filed: Nov. 9, 2010

(65) Prior Publication Data
US 2011/0110383 A1    May 12, 2011

(30) Foreign Application Priority Data

Nov. 10, 2009   (TW) .................................. 98138038 A

(51) Int. Cl.
*H04L 12/28* (2006.01)
(52) U.S. Cl.
USPC .......................................................... 370/419
(58) Field of Classification Search
None
See application file for complete search history.

(56) References Cited

U.S. PATENT DOCUMENTS

| | | | |
|---|---|---|---|
| 7,733,889 B2 * | 6/2010 | Katayama | 370/412 |
| 2004/0268009 A1 * | 12/2004 | Shin et al. | 710/310 |
| 2007/0076735 A1 * | 4/2007 | Soo | 370/412 |
| 2010/0202470 A1 * | 8/2010 | Luan | 370/412 |

FOREIGN PATENT DOCUMENTS

| | | |
|---|---|---|
| CN | 1390417 | 1/2003 |
| CN | 101025725 | 8/2007 |
| TW | 200409490 | 6/2004 |
| TW | I243565 | 11/2005 |

* cited by examiner

*Primary Examiner* — Chirag Shah
*Assistant Examiner* — Amar Persaud
(74) *Attorney, Agent, or Firm* — Muncy, Geissler, Olds & Lowe, PLLC

(57) ABSTRACT

The disclosure is a network interface controller (NIC) capable of sharing buffers, which is coupled to a host and a network to make the network connection. The NIC includes a transmitting buffer, a transmitting controller, a receiving buffer, and a receiving controller. The transmitting controller controls the transmitting buffer to transmit the transmission data provided by the host to the network. The receiving controller controls the receiving buffer to transmit the reception data received from the network to the host, and determines a storage capacity of the receiving buffer. When the storage capacity is smaller than a set value, the receiving controller transmits a request signal to the transmitting controller, the transmitting controller generates a response signal according to the request signal and a status signal corresponding to the transmitting buffer, and the receiving controller controls whether reception data is stored in the transmitting buffer according to the response signal.

18 Claims, 5 Drawing Sheets

NETWORK INTERFACE CONTROLLER CAPABLE OF SHARING BUFFERS AND BUFFER SHARING METHOD

CROSS-REFERENCES TO RELATED APPLICATIONS

This non-provisional application claims priority under 35 U.S.C. §119(a) on Patent Application No. 98138038 filed in Taiwan, R.O.C. on 2009 Nov. 10, the entire contents of which are hereby incorporated by reference.

BACKGROUND

1. Technical Field

The disclosure relates to a network interface controller (NIC), and more particularly to an NIC capable of sharing buffers and a buffer sharing method.

2. Related Art

A conventional network interface controller (NIC) has transmission and reception functions, and is used for receiving data in a network environment and transmitting data to a network environment. A transmitting end and a receiving end of the NIC both have a dedicated buffer, constituting a transmitting buffer and a receiving buffer, respectively.

For a circuit at the transmitting end, when a computer device has data to be transmitted and informs the NIC, the NIC reads out the data from a memory of the computer device, stores the data in the transmitting buffer first, and then transmits the data to the network after suitable processing.

From another point of view, for a circuit at a receiving end, when the NIC receives the data from the network, the NIC first stores the data in the receiving buffer, confirms that the data is correct, writes the data into the memory of the computer device, and informs the computer device that the data is delivered from the network. Thus, in a current network environment, behaviors of transmission and reception are independent to each other, so that the transmitting buffer and receiving buffer are designed separately to avoid mutual data interference.

However, since electronic products have higher power saving demands, the duration required for a computer device to return to a work mode from a power-saving mode has become longer. The receiving buffer therefore needs a larger capacity for storing data from the network, in order to prevent data loss caused by the capacity of the receiving buffer being filled by the network data before the computer device is able to respond to the demand of the NIC when returning to work mode from power-saving mode. However, even minor increases of the buffer storage capacity incur higher production cost.

SUMMARY OF INVENTION

This being the case, the disclosure is directed to a network interface controller (NIC) capable of sharing buffers and a buffer sharing method. By means of the NIC or method according to the disclosure, an idle transmitting buffer is utilized to store more data from a network without increasing a storage capacity of a receiving buffer, so as to solve the problem of data loss without causing additional cost.

The disclosure provides an NIC capable of sharing buffers, coupled to a host connected to a network through the NIC. The NIC includes a transmitting buffer, a transmitting controller, a receiving buffer, and a receiving controller. The transmitting buffer stores transmission data provided by the host. The transmitting controller is coupled to the transmitting buffer and controls the transmitting buffer to transmit the transmission data to the network. The receiving buffer stores reception data received from the network. The receiving controller is coupled to the receiving buffer, controls the receiving buffer so it transmits the reception data to the host, and determines a storage capacity of the receiving buffer. When the storage capacity is smaller than a set value, the receiving controller transmits a request signal to the transmitting controller, the transmitting controller generates a response signal according to the request signal and a status signal corresponding to the transmitting buffer, and the receiving controller controls whether the reception data is stored in the transmitting buffer according to the response signal.

The disclosure also provides a buffer sharing method applied to a host connected to a network. The buffer sharing method includes the following steps: providing a transmitting buffer for storing transmission data provided by the host; controlling the transmitting buffer so it transmits the transmission data to the network; providing a receiving buffer for storing reception data received from the network; controlling the receiving buffer so it transmits the reception data to the host; determining a storage capacity of the receiving buffer; when the storage capacity is smaller than a set value, transmitting a request signal; according to the request signal and a status signal corresponding to the transmitting buffer, generating a response signal; according to the response signal, controlling whether the reception data is stored in the transmitting buffer.

The preferred embodiments and efficacies of the disclosure are illustrated below with reference to the accompanying drawings.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
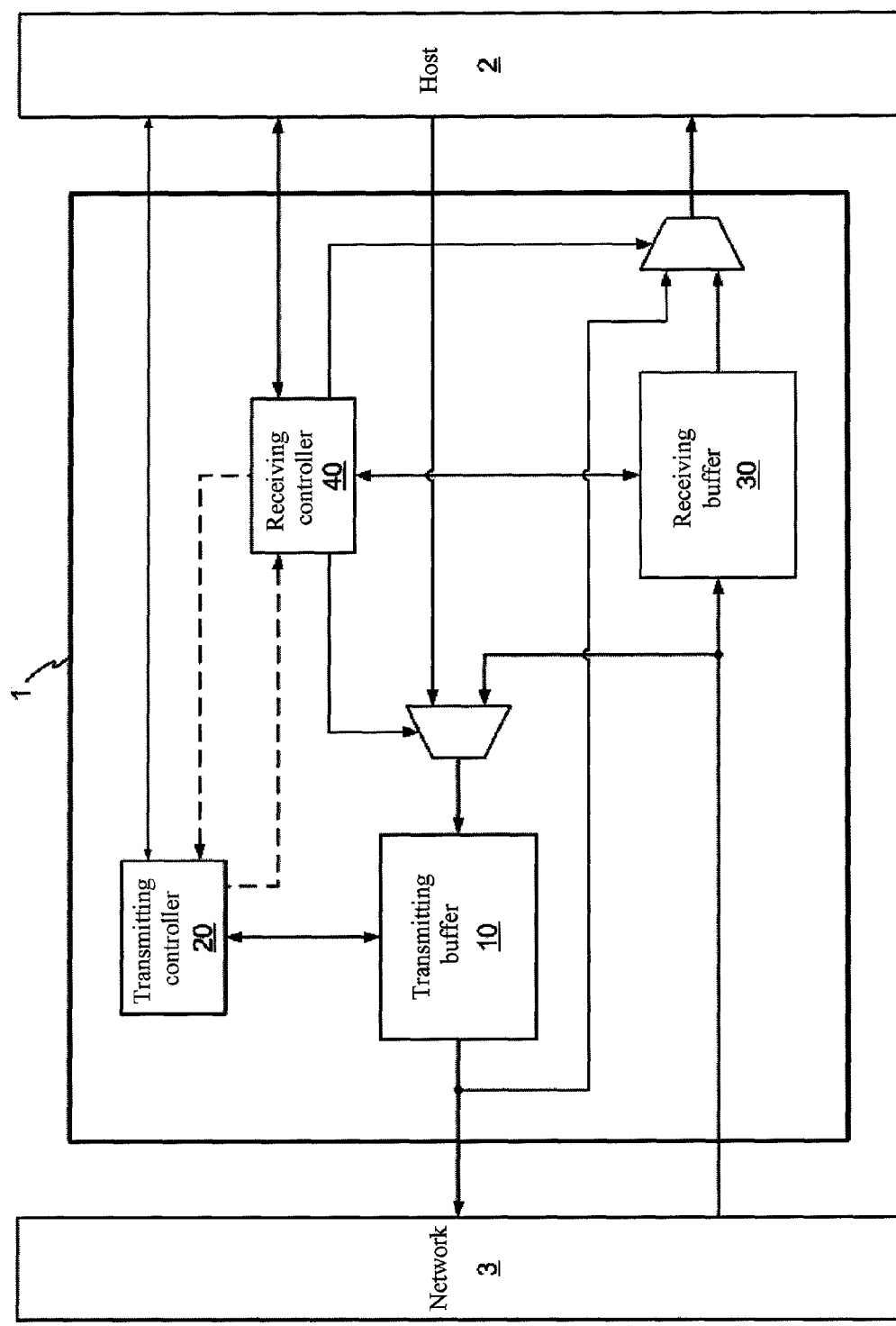
FIG. 1 is a schematic view of an NIC capable of sharing buffers according to an embodiment.

FIG. 1 is a schematic view of a network interface controller (NIC) capable of sharing buffers according to a first embodiment. An NIC 1 provided in the disclosure is coupled to a host 2, and the host 2 is connected to a network 3 through the NIC 1. The NIC 1 includes a transmitting buffer 10, a transmitting controller 20, a receiving buffer 30, and a receiving controller 40.

The NIC 1 can receive data from the network 3 and can also transmit data of the host 2 to the network 3. Therefore, the NIC 1 has both transmission and reception functions. The transmitting buffer 10 stores transmission data provided by the host 2. The transmitting controller 20 is coupled to the transmitting buffer 10, and controls the transmitting buffer 10 to transmit the transmission data to the network 3. The transmitting buffer 10 and the transmitting controller 20 are transmission-related elements.

In another aspect, reception-related elements are showing as follows. The receiving buffer 40 stores reception data received from the network 3. The receiving controller 40 is coupled to the receiving buffer 30, controls the receiving buffer 30 to transmit the reception data to the host 2, and determines a storage capacity of the receiving buffer 30.

When the storage capacity of the receiving buffer 30 is smaller than a set value, the set value can be decided according to demands. The receiving controller 40 transmits a request signal to the transmitting controller 20, the transmitting controller 20 generates a response signal according to the request signal and a status signal corresponding to the transmitting buffer, and the receiving controller 40 then controls whether the reception data is stored in the transmitting buffer 10 according to the response signal.

The status signal includes a first use status of the transmitting buffer 10, and a second use status between the host 2 and the transmitting buffer 10. When the first use status is that the transmission data is not stored in the transmitting buffer 10, or the second use status is that the host 2 does not have the transmission data to be transmitted to the transmitting buffer 10, it indicates that the transmitting buffer 10 is in an idle status and can be lent for use at the receiving end at this time, and the response signal permits the receiving controller 40 to control the reception data to be stored in the transmitting buffer 10.

When the reception data changes to be stored in the transmitting buffer 10, the receiving controller 40 can set a break point at the receiving buffer 30 to know where the reception data being stored. That is, when the data stored in the receiving buffer 30 is read, if a read pointer reads a break point, it is known that a location where next reception data is stored is changed to the transmitting buffer 10, so that the read pointer reads the next reception data from the transmitting buffer 10.

In addition, in order to avoid the problem that the transmitting buffer 10 is unable to store the transmission data because the receiving controller 40 occupies the transmitting buffer 10 for a long time so that the transmission data of the host 2 cannot be transmitted to the network 3, the transmitting controller 20 can further generate a response signal according to the number of break points. When the number of the break points is greater than or equal to 1, it indicates that previously the receiving controller 40 already requests to store the reception data in the transmitting buffer 10, and the reception data stored in the transmitting buffer 10 is not yet completely read; at this time, if the receiving controller 40 sends a request signal again, the response signal generated by the transmitting controller 20 does not permit the receiving controller 40 to control the reception data so it is stored in the transmitting buffer 10 again.

However, if the host 2 can endure a relatively long wait time, even though the reception data is still stored in the transmitting buffer 10, the transmitting controller 20 also permits the receiving controller 40 to store the reception data in the transmitting buffer 10 again. At this time, the receiving controller 40 further sets a break point in the receiving buffer 30, so that the number of break points is greater than 1.

In the following, the operation processes of writing and reading are illustrated based on the receiving buffer 30 and the transmitting buffer 10 respectively.

Figure 2:
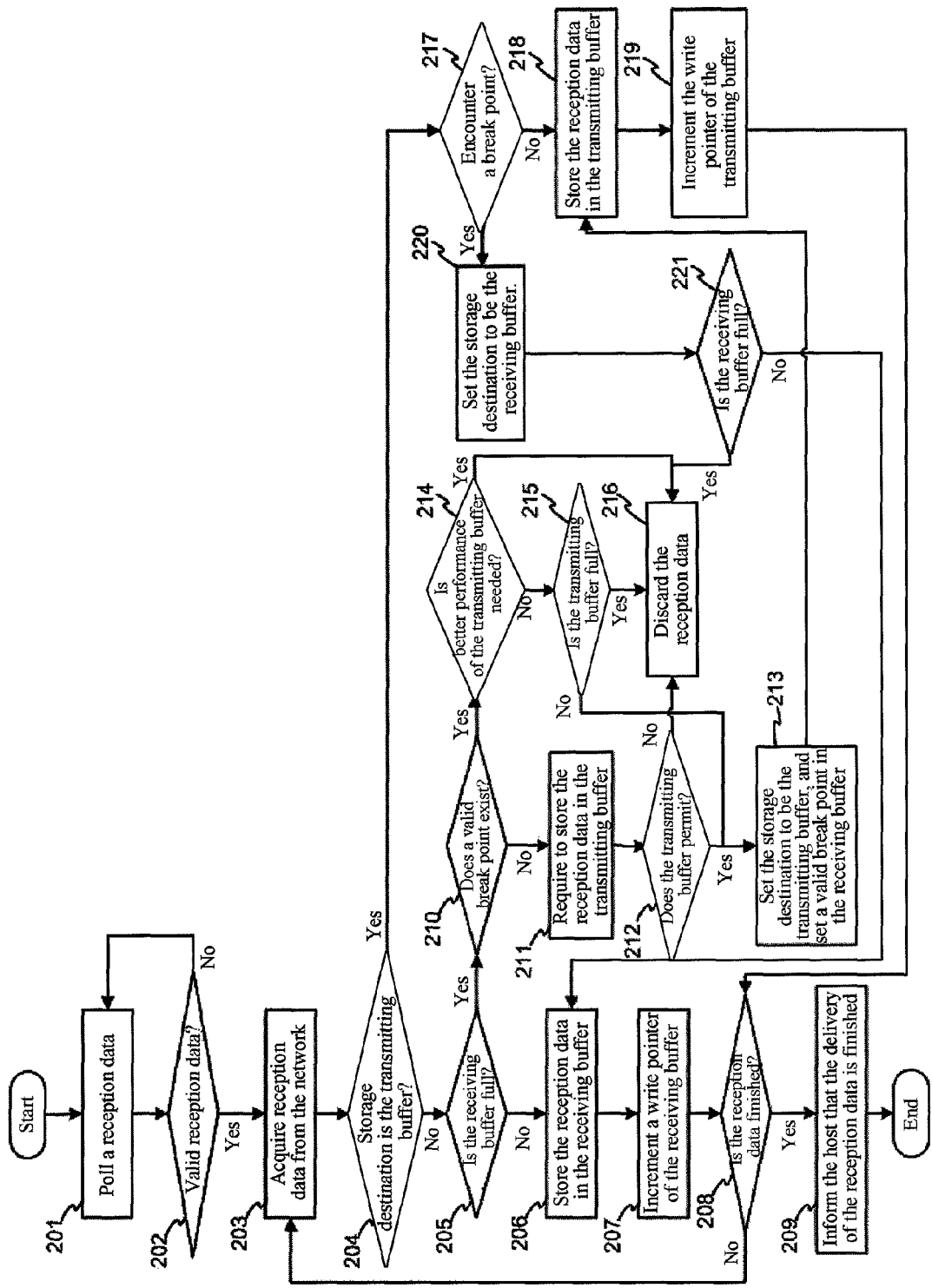
FIG. 2 is a flow chart of writing operation performed by a receiving buffer according to an embodiment.

FIG. 2 is a flow chart of writing operation performed by a receiving buffer according to an embodiment. First, in Steps 201 and 202 it is observed whether valid reception data transmitted from a network is received. In Steps 203 and 204 reception data is acquired from the network, and it is determined whether a write destination is a transmitting buffer or a receiving buffer. If the write destination in Step 205 is the receiving buffer, it is determined whether the storage capacity of the receiving buffer is full. If not, in Steps 206 and 207 the reception data acquired from the network is written to the receiving buffer, and 1 is added to the write pointer. In Step 208 it is determined whether the reception data is the last data. If so, in Step 209 the host is informed that the reception data is to be uploaded. If not, the process returns to Step 203, and the reception data continues to be written.

In Step 205, if it is determined that the receiving buffer is full, in Step 210 it is determined whether a break point already exists. If not, in Step 211 the receiving controller requests the use right of the transmitting buffer from the transmitting controller. The transmitting controller determines whether to agree to lend the transmitting buffer according to a current use status. According to an embodiment, the transmitting controller agrees to lend the transmitting buffer only when the transmitting buffer is empty and the host has no transmission data to be transmitted.

In Step 212 the receiving controller determines whether the transmitting controller agrees to lend the transmitting buffer. If not, in Step 216 the reception data is discarded, since at this time the receiving buffer is already full and the transmitting controller does not agree to lend the transmitting buffer. Conversely, if so (the transmitting controller agrees to lend the transmitting buffer), it is arranged so that a write destination of the reception data is changed to the transmitting buffer. At the same time, the write pointer of the current receiving buffer is saved as a valid break point and 1 is added to the number of the break points. Therefore, when the read pointer encounters the break point, it is known that the next reception data is changed so as to be stored in the transmitting buffer. Next, in Steps 218 and 219 the reception data acquired from the network is written in the transmitting buffer, 1 is added to the write pointer, and the process returns to Step 208.

In Step 204, if it is determined that the storage destination is the transmitting buffer, in Step 217 it is determined whether the write pointer encounters the break point. If not, Step 218 is performed. If so, it represents that at this time the space of the transmitting buffer is full, so that in Step 220 the storage destination is changed back to the original receiving buffer, and in Step 221 it is determined whether the storage capacity of the receiving buffer is full. If so, it represents that at this time the space of both the transmitting buffer and the receiving buffer are full, and in Step 216 the reception data is discarded. If not, the write destination of the reception data is set as the receiving buffer, and the process returns to Step 206.

In addition, when it is determined that a break point already exists in Step 210, it represents that the reception data is already stored in the transmitting buffer, so that in Step 214, it is determined whether better performance of the transmitting buffer is needed. If so, it represents that in order to avoid the problem of the original transmission function performance of the transmitting buffer being affected because the receiving controller occupies the transmitting buffer for a long time, in Step 216 the reception data is directly discarded, so as to obtain better transmitting buffer performance. Conversely, if not, it represents that the transmitting buffer does not need better performance, so in Step 215 it is determined whether the transmitting buffer is full, and if the transmitting buffer still has space Step 213 is performed again.

Figure 3:
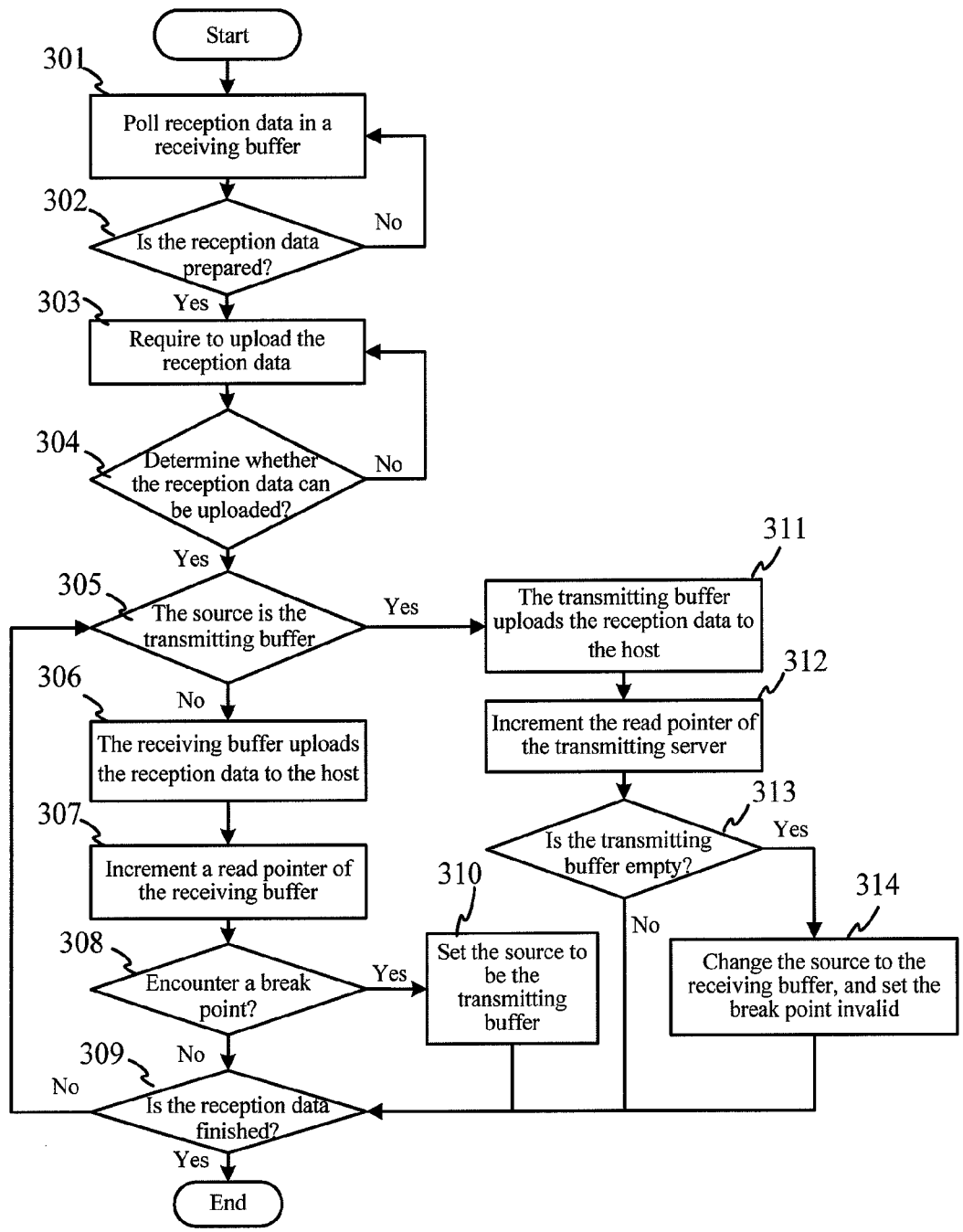
FIG. 3 is a flow chart of reading operation performed by a receiving buffer according to an embodiment.

FIG. 3 is a flow chart of reading operation performed by a receiving buffer according to an embodiment. Here, it is illustrated that the receiving controller returns a control right of the transmitting buffer borrowed from the transmitting controller. First, in Steps 301 and 302 there is a pause until preparation of the reception data is finished. In Steps 303 and 304 the host is required to upload the reception data. Next, in Step 305 it is determined whether the reception data to be read is from the transmitting buffer or the receiving buffer. If the reception data is from the receiving buffer, in Steps 306 and 307 the reception data is read from the receiving buffer and uploaded to the host, then 1 is added to the read pointer.

In Step 308 it is determined whether the read pointer encounters the break point. If so, in Step 310 a source of the next reception data to be read is set to be the transmitting buffer. Next, if not, in Step 309 it is determined whether the reception data is the last data in the reception data. If so, the process ends. If not, the process returns to Step 305.

In Step 305, if it is determined that the reception data is from the transmitting buffer, in Steps 311 and 312 the reception data is read from the transmitting buffer and uploaded to the host, and 1 is added to the read pointer.

Subsequently, in Step 313 it is determined whether the transmitting buffer is empty. The determination method can include determining whether the read pointer is equal to the write pointer or the break point. If so, it represents that the transmitting buffer is empty. When the transmitting buffer is empty, it represents that the reception data originally stored in the transmitting buffer is completely read, so in Step 314 a source destination of the next reception data to be read is set as the receiving buffer. At the same time the break point becomes invalid, that is, 1 is subtracted from the number of the break points. When the number of the break points is equal to zero, it represents that the transmitting buffer's right of control is returned to the transmitting controller. If a determination result in Step 313 is that the transmitting buffer is not empty, the process moves to Step 309.

Figure 4:
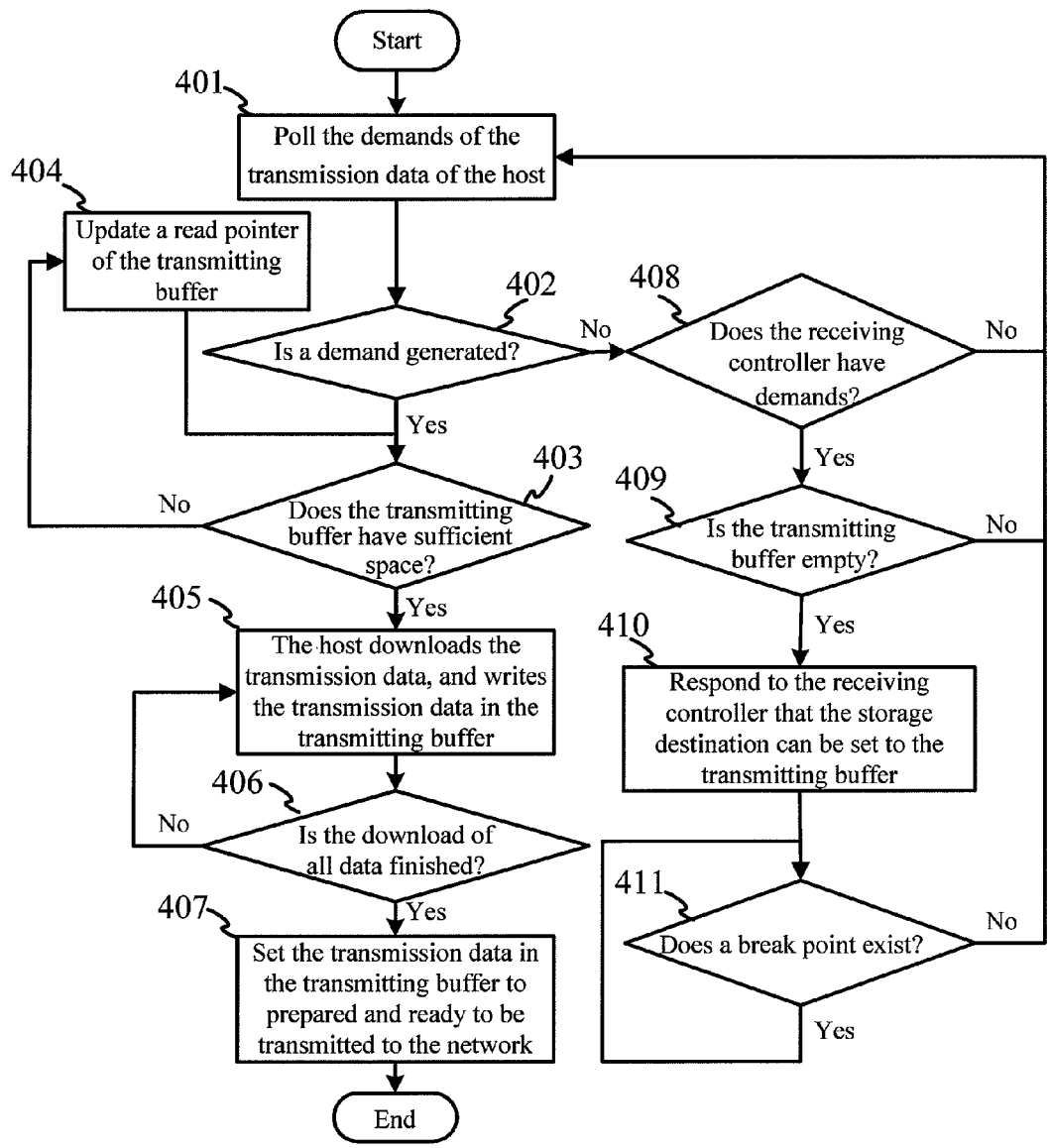
FIG. 4 is a flow chart of writing operation performed a transmitting buffer according to an embodiment.

FIG. 4 is a flow chart of writing operation performed by a transmitting buffer according to an embodiment. Here it is illustrated that the transmitting controller determines whether to release the control right of the transmitting buffer for use by the receiving controller according to the status between the host and the transmitting buffer. In this embodiment, when the host has no transmission data to be transmitted and no transmission data is stored in the transmitting buffer, it is agreed that the receiving controller requests to use the control right of the transmitting buffer, and the transmitting controller continues to wait for the receiving controller to return the control right of the transmitting buffer.

First, in Steps 401 and 402 the host is queried whether the demands of the transmission data exist. If so, it represents that the transmission data is firstly stored in the transmitting buffer, so firstly in Step 403 it is determined whether the space of the transmitting buffer is sufficient. If not, in Step 404 the read pointer of the transmitting buffer is updated, the transmission data in the transmitting buffer waits to be transmitted, and new storage space is generated. If the space of the transmitting buffer is already sufficient, in Step 405, the host downloads the transmission data, and writes the transmission data in the transmitting buffer. Next, in Step 406 it is determined whether the download of the transmission data is finished. If not, the process returns to Step 405 to continue download. If so, in Step 407 the transmission data in the transmitting buffer is set to prepared and ready to be transmitted to the network.

In Step 402, if it is determined that the host does not have the demand of the transmission data, in Step 408 it is determined whether the receiving controller has the demand of borrowing the transmitting buffer. If no, the process returns to Step 401. If so, in Step 409 it is further determined that the transmitting buffer is not empty. If not, the transmitting buffer still cannot be lent so the process returns to Step 401. If so, in Step 410 the receiving controller is responded with that the storage destination can be set as the transmitting buffer, that is, it is agreed to lend the transmitting buffer.

When it is agreed to lend the transmitting buffer, it represents that the transmitting buffer is controlled by the receiving controller, and the determination in Step 411 is performed. When no break point exists, it represents that the receiving controller already returns the control right of the transmitting buffer to the transmitting controller, so the process returns to Step 401 again.

Figure 5:
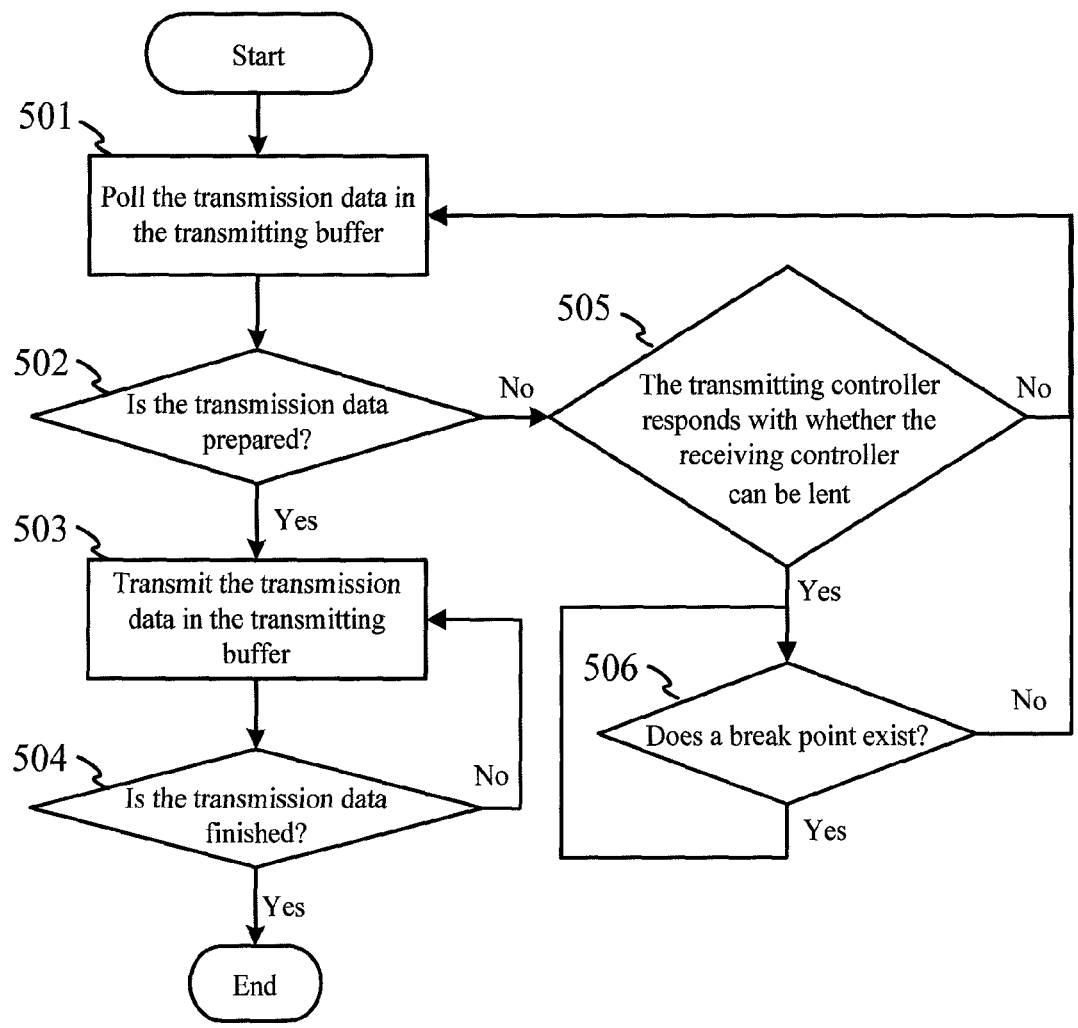
FIG. 5 is a flow chart of reading operation performed by a transmitting buffer according to an embodiment.

FIG. 5 is a flow chart of reading operation performed by a transmitting buffer according to an embodiment. First, in Steps 501 and 502 it is queried whether the preparation of the transmission data is finished. If so, Step 503 is performed and the transmission data in the transmitting buffer is transmitted. Next, in Step 504 it is determined whether the transmission data is finished. If not, the process returns to Step 503 and transmission continues. If so, the process ends.

In Step 502, if the determination result is that no transmission data is ready to be transmitted, that is to say, the host does not have transmission data to be transmitted, Sn step 505, in this status it is determined whether the transmitting controller agrees to lend the transmitting buffer. If not, the process returns to Step 501. If so, it represents that the transmitting buffer is controlled by the receiving controller instead, so in Step 506, when it is determined that no break point exists, representing that the receiving controller already returns the control right of the transmitting buffer to the transmitting controller, the process again returns to Step 501.

As can be seen from the previous explanation, when the storage capacity of the receiving buffer 30 is about to be full and when the transmitting buffer 10 is idle, the receiving controller 40 changes to store the reception data in the transmitting buffer 10, and at the same time the operation of the transmitting controller 20 is suspended. After the host 2 returns to a normal work status from a power-saving status, the receiving controller 40 can write the reception data temporarily stored in the transmitting buffer 10 into the memory of the host 2, and return the use right of the transmitting buffer 10 to the transmitting controller 20, so as to recover the normal operation of the transmission function of the NIC 1. There is thus no need to increase the storage capacity of the receiving buffer, and no extra cost is needed to store more data from the network, solving the problem in the prior art of reception data loss.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A network interface controller (NIC), coupled to a host connected to a network through the NIC, comprising:
   a transmitting buffer, storing a transmission data provided by the host;
   a transmitting controller, coupled to the transmitting buffer, controlling the transmitting buffer to transmit the transmission data to the network;
   a receiving buffer, storing a reception data received from the network; and
   a receiving controller, coupled to the receiving buffer, controlling the receiving buffer to transmit the reception data to the host, and determining a storage capacity of the receiving buffer;

wherein when the storage capacity of the receiving buffer is smaller than a set value, the receiving controller transmits a request signal to the transmitting controller, the transmitting controller generates a response signal to the receiving controller according to the request signal received from the receiving controller and a status signal received from the transmitting buffer, and the receiving controller controls whether the reception data is stored in the transmitting buffer according to the response signal, when the reception data is stored in the transmitting buffer, the receiving controller sets a break point in the receiving buffer, that identifies the location of the reception data stored in the transmitting buffer according to the break point, wherein the break point is an interrupt stored in the receiving buffer that points to an address in the transmitting buffer.

2. The NIC according to claim 1, wherein the status signal comprises a first use status of the transmitting buffer, and a second use status between the host and the transmitting buffer.

3. The NIC according to claim 2, wherein when the first use status is that the transmission data is not stored in the transmitting buffer, or the second use status is that the host does not have transmission data to be transmitted to the transmitting buffer, the response signal permits the receiving controller to control the reception data to be stored in the transmitting buffer.

4. The NIC according to claim 1 wherein the transmitting controller further generates the response signal according to a number of the break points.

5. The NIC according to claim 4, wherein when the number of the break points is greater than or equal to 1, the response signal does not permit the receiving controller to control the reception data to be stored in the transmitting buffer.

6. The NIC according to claim 1, wherein after the receiving controller controls the transmitting buffer uploading the reception data to the host, when the transmitting buffer is empty, the receiving controller invalidates the break point.

7. A buffer sharing method, applied to a host connected to a network, comprising the steps of:
providing a transmitting buffer for storing transmission data provided by the host;
controlling the transmitting buffer to transmit the transmission data to the network;
providing a receiving buffer for storing reception data received from the network;
controlling the receiving buffer to transmit the reception data to the host;
determining a storage capacity of the receiving buffer;
when the storage capacity of the receiving buffer is smaller than a set value, the receiving controller transmitting a request signal to the transmitting controller;
generating by the transmitting controller a response signal to the receiving controller according to the request signal received from the receiving controller and a status signal received from the transmitting buffer;
controlling by the receiving controller whether the reception data is stored in the transmitting buffer according to the response signal; and
when the reception data is stored in the transmitting buffer, the receiving controller setting a break point in the receiving buffer that identifies the location of the reception data stored in the transmitting buffer according to the break point;

wherein the break point is an interrupt stored in the receiving buffer that points to an address in the transmitting buffer.

8. The buffer sharing method according to claim 7, wherein the status signal comprises a first use status of the transmitting buffer, and a second use status between the host and the transmitting buffer.

9. The buffer sharing method according to claim 8, further comprising the step of:
when the first use status is that the transmission data is not stored in the transmitting buffer, or the second use status is that the host does not have the transmission data to be transmitted to the transmitting buffer, generating the response signal that permits storage; and
controlling the reception data to be stored in the transmitting buffer.

10. The buffer sharing method according to claim 7, wherein the generating the response signal step comprises:
further according to a number of the break points, generating the response signal.

11. The buffer sharing method according to claim 10, further comprising the step of:
when the number of the break points is greater than or equal to 1, generating the response signal that does not permit storage.

12. The buffer sharing method according to claim 7, further comprising the step of:
uploading the reception data stored in the transmitting buffer to the host;
when the transmitting buffer is empty, the receiving controller invalidates the break point.

13. A network interface controller (NIC), comprising:
a transmitting buffer, storing a transmission data;
a transmitting controller, coupled to the transmitting buffer, controlling the transmitting buffer to transmit the transmission data to a network;
a receiving buffer, storing a reception data received from the network; and
a receiving controller, coupled to the receiving buffer, for determining a storage capacity of the receiving buffer;
wherein when the storage capacity of the receiving buffer is smaller than a set value, the receiving controller transmits a request signal to the transmitting controller, the transmitting controller generates a response signal to the receiving controller according to the request signal received from the receiving controller and a status signal received from the transmitting buffer, and the receiving controller controls whether the reception data is stored into the transmitting buffer according to the response signal, when the reception data is stored in the transmitting buffer, the receiving controller sets a break point in the receiving buffer, that identifies the location of the reception data stored in the transmitting buffer according to the break point, wherein the break point is an interrupt stored in the receiving buffer that points to an address in the transmitting buffer.

14. The NIC according to claim 13, wherein the status signal comprises a first use status of the transmitting buffer, and a second use status between the host and the transmitting buffer.

15. The NIC according to claim 14, wherein when the first use status is that the transmission data is not stored in the transmitting buffer, or the second use status is that the host does not have the transmission data to be transmitted to the transmitting buffer, the response signal permits the receiving controller to control the reception data to be stored in the transmitting buffer.

16. The NIC according to claim 13, wherein the transmitting controller further generates the response signal according to a number of the break points.

17. The NIC according to claim 16, wherein when the number of the break points is greater than or equal to 1, the response signal does not permit the receiving controller to control the reception data to be stored in the transmitting buffer.

18. The NIC according to claim 13, wherein after the receiving controller controls the transmitting buffer uploading the reception data, when the transmitting buffer is empty, the receiving controller invalidates the break point.

* * * * *